Sept. 7, 1965     R. S. TRIMMER     3,204,736
FLUID TRANSMISSION
Filed May 31, 1963     2 Sheets-Sheet 1
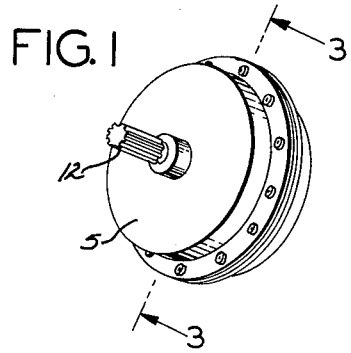
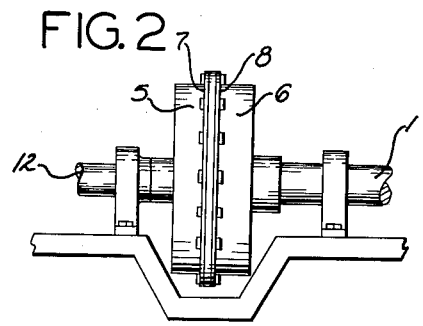
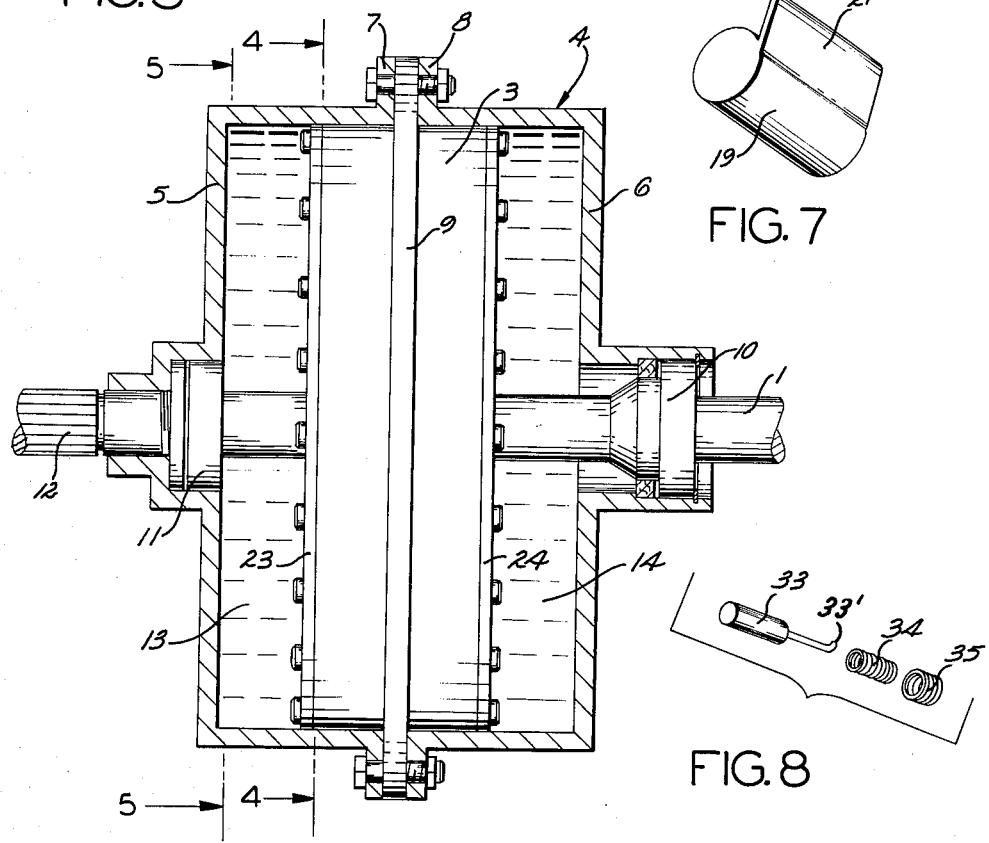
INVENTOR.
RUSSELL S. TRIMMER
BY
ATTORNEY

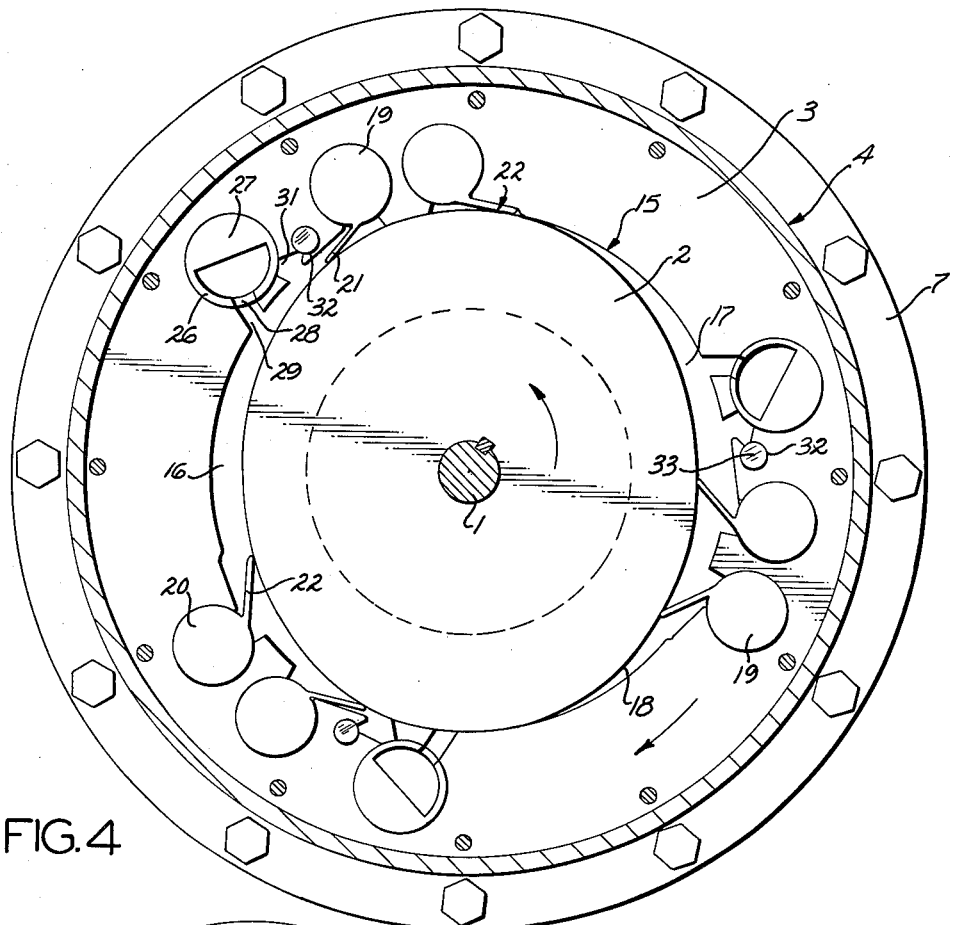
FIG.4
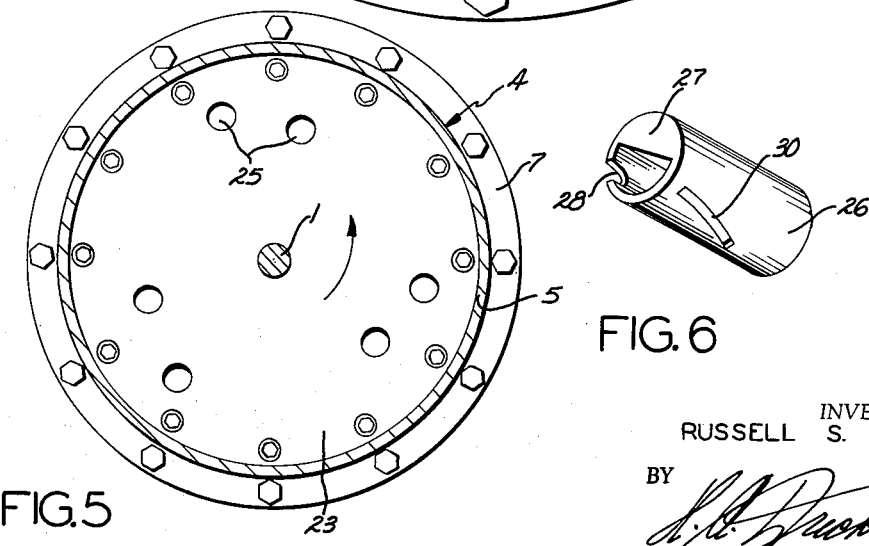
FIG.5
FIG.6
INVENTOR.
RUSSELL S. TRIMMER
BY
ATTORNEY

3,204,736
FLUID TRANSMISSION
Russell S. Trimmer, 14703 Gibson Ave., Compton, Calif.
Filed May 31, 1963, Ser. No. 284,476
11 Claims. (Cl. 192—58)

This invention relates to a fluid transmission whereby the r.p.m., of the engine is determined by the load which it is pulling. The greater the load the higher the r.p.m., of the engine up to the structural limit of the engine and the transmission.

An object of my invention is to provide a novel fluid transmission which will automatically permit the r.p.m., of the engine to increase if the load carried by the engine should increase materially.

Another object of my invention is to provide a novel fluid transmission which will permit the compression of the engine to be utilized when a vehicle is rolling downhill, and also will permit the forward motion of the vehicle to turn the engine in order to start the same without the aid of the starting motor.

Still another object of my invention is to provide a novel fluid transmission which is simple in construction and utilizing a minimum number of parts to produce the advantages enumerated herein.

Other objects, advantages and features of invention may appear from the accompanying drawing, the subjoined detailed description and appended claims.

In the drawing:

FIGURE 1 is a perspective view of my fluid transmission.

FIGURE 2 is a side elevation of the same.

FIGURE 3 is a vertical sectional view taken on line 3—3 of FIGURE 1.

FIGURE 4 is a vertical sectional view taken on line 4—4 of FIGURE 3.

FIGURE 5 is a vertical sectional view on a reduced scale taken on line 5—5 of FIGURE 3.

FIGURE 6 is a perspective view of one of the valve sleeves.

FIGURE 7 is a perspective view of one of the rotor sealing members.

FIGURE 8 is a perspective view of one of the spring pressed valves.

Referring more particularly to the drawing, the numeral 1 indicates the driving shaft which extends from the engine or motor (not shown). The shaft 1 is fixedly attached or keyed to the rotor 2 which is prolate in shape. The exact shape of the rotor 2 is not critical and can be a modified ellipse in shape or other similar shaped structures to provide compression chambers within the transmission, as will be subsequently described. The rotor 2 is positioned within a ring 3 and the ring, in turn, is fixedly mounted within the housing 4. The housing 4 is formed in two pieces 5 and 6 which are bolted together through the flanges 7 and 8 respectively. These flanges abut a peripheral flange 9 on the ring 3; thus the ring 3 is fixedly mounted within the housing assembly 4 and rotates with that assembly. The shaft 1 is journaled in the housing 4 in suitable bearings 10 and 11, so that both the shaft and the housing 4 are both adequately supported. The driven shaft 12 extends from the housing 4 and one end is fixedly attached to this housing. The driven shaft 12 extends to the work load of the engine, such as the driving wheels of a vehicle or the like. The ring 3 is approximately centrally positioned within the housing 4 and two sumps 13 and 14 are thus provided one on each side of the ring, and these sumps are entirely filled with a suitable fluid such as oil; this fluid flowing into and out of the space within the ring 3 as the transmission rotates, and as will be subsequently described in detail. The ring 3 is formed with a circular inner surface indicated at 15 and this surface is swept by the surface of maximum diameter of the prolate rotor 2. Thus there are three compression chambers formed between the outer surface of the rotor surface 2 and the inner surface 15 of the ring 3, these compression chambers are indicated at 16, 17 and 18. As the rotor 2 is driven by the engine or motor, it will sweep the surface 15 and will move fluid contained in the compression chambers 16, 17 and 18 continuously in a circular movement.

The compression chambers 16, 17 and 18 are defined at both ends thereof by three pairs of sealing members as follows: The sealing members are identical in construction and only one pair will be described in detail. At the lower end of each of the compression chambers 16, 17 and 18, I provide a cylinder 19 which is journaled in the ring 3 and extends transversely through that ring. A second cylinder 20 is similarly mounted at the other end of each of the compression chambers. The cylinder 19 is provided with a flat plate or finger 21, the outer edge of which bears against the periphery of the rotor 2. The cylinder 20 is similarly formed with a flat plate or finger 22 which also bears against the periphery of the rotor 2. These two fingers thus bearing against the surface of the rotor 2 will confine any fluid between them as the rotor 2 rotates in the direction indicated by the arrow.

To permit a free and constant flow of fluid from the sumps 13–14 into and out of the compression chambers 16, 17 and 18, I provide a pair of sealing plates 23 and 24 which are bolted to the outer faces of the ring 3 and within the housing 4. These plates are provided with a plurality of ports 25 which are variously spaced both angularly and radially, so that one or more of these ports are always open to the compression chambers whatever the position of the rotor 2 might be.

If the ports 25 were merely left open at all times there would be no driving force on the driven shaft 12, since oil would merely circulate. However, the circulation of the oil is restricted and controlled in the following manner: A sleeve valve 26 is journaled in the ring 3 and extends horizontally from one side of this ring to the other. The sleeve is formed with a solid or weighted side 27 which will cause the sleeve to rotate under centrifugal force when the ring 3 rotates at a substantial speed. A port 28 in the sleeve 26 coincides with a duct 29 in the ring 3. The duct 29 extends from the inner surface 15 of the ring and thence outwardly to the port 28, and coincides with that port in one position of the parts. A venting slot 30 in the side of the sleeve 26 permits fluid to flow into the outlet channel 31, and thence into a transverse outlet port 32. The outlet ports 32 extend to the sumps 13 or 14 and these ports are controlled by a cylinder piston valve 33. The piston valve 33 is provided with a finger 33', the end of which finger projects into the inclined or cam slot 30. Thus when the piston valve 33 is moved under pressure, the sleeve 26 will be partly rotated to move the port 28 to positions permitting the flow of fluid to the sumps 13 or 14. The sleeve 26 is thus controlled both by the piston valve 33 and by centrifugal force acting on the weight 27. The finger 33' will also tend to return the sleeve valve 26 to its original position with port 28 communicating with duct 29 when pressure is relieved on the piston valve 33, and the springs 34 and 35 return the piston 33 to its original position. The piston valve 33 is engaged by two coil springs 34 and 35, one of these springs being relatively light and permitting the valve to partly open under relatively low pressures, while the heavy spring 35 will only permit the valve to open under high pressures. Thus at low r.p.m., of the rotor 2, the pressure within the compression chambers 16, 17 and 18 is relatively small. The valve 33 will partly open permitting fluid to flow at a restricted rate from the compression chambers back into the sumps 13–14. When the ring 3 rotates at a higher r.p.m., due to higher r.p.m., of the rotor 2, the sleeves 26 will rotate under centrifugal force and the notch 28 therein will partly or entirely close the ducts 29. Thus pressure will build up in the compression chambers 16, 17 and 18 until the strong spring 35 is compressed, permitting the valve 33 to be entirely open and thus permitting a greater flow of fluid back into the sumps 13–14. Since the sumps 13 and 14 are entirely filled with fluid, they will carry approximately the same pressures as the compression chambers. However, a circulation of oil will be permitted through the ports 32 and back into the compression chambers 16, 17 and 18 through the holes 25. When the valves 26 close off the ducts 29 the driving ratio will be approximately 1 to 1 between the rotor 2 and the ring 3. As the r.p.m. of the rotor is decreased the drive ratio between the rotor and the ring 3 is increased, since centrifugal force on the sleeves 26 will permit opening of the ducts 29, thus permitting freer circulation of fluid and an increased driving ratio will result.

*In operation*

The prolate shaped rotor 2 is rotated by the driving engine, and assuming first that the engine revolves at a low r.p.m. The high points of the rotor will engage the inner surface 15 of the ring 3 and will move fluid in the chambers 16, 17 and 18 towards one end thereof, namely, towards the fingers 22 which close or obstruct one end of each of these chambers. The sleeve valves 26 are in a position so that the ports 28 are open. These ports partly restrict the ducts 29 but still permit flow of fluid through the sleeve valves 26, and thence out through the slot 30, and thence into the sumps 13 and 14 past the valve 33. The partial restriction of the free flow of fluid will cause the ring 3 and the housing 4 to rotate in the same direction as the rotor 2, but at a much slower r.p.m. In other words, there is a reduced driving ratio between the rotor 2 and the housing 4.

As the speed of the rotor 2 increases the sleeve valves 26 will be rotated, due to centrifugal force, to entirely or partly close the ducts 29. This will cause an increased fluid pressure in the compression chambers 16, 17 and 18 and an approximate 1 to 1 driving ratio between the rotor 2 and the housing 4.

If the pressure of the fluid in the chambers 16, 17 and 18 becomes greater than the heavy coil spring 35, then that coil spring compresses, allowing the valves 33 to open their maximum amount and permitting withdrawal of higher pressure fluid from the chambers 16, 17 and 18, and this reduced fluid pressure will permit higher r.p.m., of the rotor 2, or an increase in r.p.m., of the engine to thus overcome the additional load on the driven shaft 12. As the r.p.m., of the housing 4 decreases, centrifugal force on the sleeve valves 26 will again permit opening of the ducts 29. This permits freer circulation of fluid from the chambers 16, 17 and 18 and a consequent reduction in pressure on the valves 33, so that the springs 35 can again partly close the valves 33 with a consequent reduced flow of fluid past these valves, which results in a gradual increase in fluid pressure in the chambers 16, 17 and 18 and the same results occur as previously described.

The cylinder valve 33 acts as a piston and its movement is controlled by the amount of pressure on its top surface. When the engine is idling the duct 29 is open and oil is circulating freely. When the engine speeds up the duct 29 cannot handle the increased amount of oil which attempts to pass through it. This causes an increased pressure on the piston valve 33. The valve then rotates the sleeve valve 26 through the medium of finger 33' and starts to close the duct 29. This will start the ring 3 to rotate. If the load becomes still greater, pressure in the chambers 16, 17 and 18 further increases, compressing the heavy spring 35 under the piston 33, permitting the piston to move a further amount until the sleeve valve 26 opens the duct 31 and permitting increased flow of fluid back to the sumps. The weighted portion 27 of the sleeve valve 26 is activated during slow driving so that the duct 29 is restricted, and to keep the driving ratio substantially 1 to 1 between the ring 3 and the rotor 2.

When the vehicle is coasting downhill there is a tendency to reverse the driving force so that it will be from the housing 4 and thence back to the rotor 2. When this occurs fluid is still trapped within the compression chambers 16, 17 and 18, due to the finger or plates 21 which are positioned at the ends of the compression chambers. Thus there is a compression brake against the vehicle to prevent free rotation of the parts, or what is termed free wheeling. The finger 21 thus acts as a gate to prevent escape of fluid when coasting downhill and the fluid is thus trapped in the chambers 16, 17 and 18 to couple the driving wheels and the engine.

Having described my invention, I claim:

1. A fluid transmission comprising a housing,
   a rotor rotatably mounted in said housing,
   said housing having a plurality of compression chambers therein, said compression chambers being arranged between the outer surface of the rotor and the inner surface of the housing,
   said housing having a sump therein, and a plurality of holes extending from the sump to each of said compression chambers through which holes fluid passes to and from the compression chambers and the sump,
   and valve means adjacent each of said compression chambers controlling the flow of fluid between the sump and the compression chambers.

2. A fluid transmission comprising a housing,
   a rotor rotatably mounted in said housing,
   said housing having a plurality of compression chambers therein, said compression chambers being arranged between the outer surface of the rotor and the inner surface of the housing,
   said housing having a sump therein, and a plurality of holes extending from the sump to each of said compression chambers through which holes fluid passes to and from the compression chambers and the sump,
   valve means adjacent each of said compression chambers controlling the flow of fluid between the sump and the compression chambers,
   said valve means being interposed between a compression chamber and one of said holes.

3. A fluid transmission comprising a housing,
   a ring fixedly mounted in said housing,
   a prolate shaped rotor rotatably mounted in said ring,
   said ring having a plurality of compression chambers therein, said compression chambers being arranged between the outer surface of the rotor and the inner surface of the ring,
   said housing having a sump therein, and a plurality of holes extending from the sump to each of said compression chambers through which holes fluid passes to and from the compression chambers and the sump,
   and valve means adjacent each of said compression chambers controlling the flow of fluid between the sump and the compression chambers.

4. A fluid transmission comprising a housing,
   a ring fixedly mounted in said housing,
   a prolate shaped rotor rotatably mounted in said ring,
   said ring having a plurality of compression chambers therein, said compression chambers being arranged between the outer surface of the rotor and the inner surface of the ring,
   said housing having a sump therein, and a plurality of holes extending from the sump to each of said compression chambers through which holes fluid passes to and from the compression chambers and the sump,
   valve means adjacent each of said compression chambers controlling the flow of fluid between the sump and the compression chambers,
   said valve means being interposed between a compression chamber and one of said holes.

5. A fluid transmission comprising a housing,
a rotor rotatably mounted in said housing,
said housing having a plurality of compression chambers therein, said compression chambers being arranged between the outer surface of the rotor and the inner surface of the housing,
gate means in the housing slidably engaging the periphery of the rotor, said gate means forming one end of each compression chamber,
said housing having a sump therein, and a plurality of holes extending from the sump to each of said compression chambers through which holes fluid passes to and from the compression chambers and the sump,
and valve means adjacent each of said compression chambers controlling the flow of fluid between the sump and the compression chambers.

6. A fluid transmission comprising a housing,
a ring fixedly mounted in said housing,
a prolate shaped rotor rotatably mounted in said ring,
said ring having a plurality of compression chambers therein, said compression chambers being arranged between the outer surface of the rotor and the inner surface of the ring,
gate means in the housing slidably engaging the periphery of the rotor, said gate means forming one end of each compression chamber,
said housing having a sump therein, and a plurality of holes extending from the sump to each of said compression chambers through which holes fliud passes to and from the compression chambers and the sump,
and valve means adjacent each of said compression chambers controlling the flow of fluid between the sump and the compression chambers.

7. A fluid transmission comprising a housing,
a rotor rotatably mounted in said housing,
said housing having a plurality of compression chambers therein, said compression chambers being arranged between the outer surface of the rotor and the inner surface of the housing,
gate means in the housing at both ends of each compression chamber, said gate means slidably engaging the periphery of the rotor, said gate means forming both ends of each compression chamber,
said housing having a sump therein, and a plurality of holes extending from the sump to each of said compression chambers through which holes fluid passes to and from the compression chambers and the sump,
and valve means adjacent each of said compression chambers controlling the flow of fluid between the sump and the compression chambers.

8. A fluid transmission comprising a housing,
a ring fixedly mounted in said housing,
a prolate shaped rotor rotatably mounted in said ring,
said ring having a plurality of compression chambers therein, said compression chambers being arranged between the outer surface of the rotor and the inner surface of the ring,
gate means in the housing at both ends of each compression chamber, said gate means slidably engaging the periphery of the rotor, said gate means forming both ends of each compression chamber,
said housing having a sump therein, and a plurality of holes extending from the sump to each of said compression chambers through which holes fluid passes to and from the compression chambers and the sump,
and valve means adjacent each of said compression chambers controlling the flow of fluid between the sump and the compression chambers.

9. A fluid transmission comprising a housing,
a ring fixedly mounted in the housing,
a prolate shaped rotor rotatably mounted in said housing and within said ring, said ring having a plurality of compression chambers therein, said compression chambers being arranged between the outer surface of the rotor and the inner surface of said ring,
said housing having a sump therein, and a plurality of holes extending from the sump to each of said compression chambers through which holes fluid passes to and from the compression chambers and the sump,
a sleeve valve adjacent each of said compression chambers and within said ring, said ring having a duct extending from the sleeve valve to a compression chamber, and a port extending from the sleeve valve to the sump to control the flow of fluid between the sump and the compression chambers.

10. A fluid transmission comprising a housing,
a ring fixedly mounted in the housing,
a prolate shaped rotor rotatably mounted in said housing and within said ring, said ring having a plurality of compression chambers therein, said compression chambers being arranged between the outer surface of the rotor and the inner surface of said ring,
said housing having a sump therein, and a plurality of holes extending from the sump to each of said compression chambers through which holes fluid passes to and from the compression chambers and the sump,
a sleeve valve adjacent each of said compression chambers and within said ring, said ring having a duct extending from the sleeve valve to a compression chamber, and a port extending from the sleeve valve to the sump to control the flow of fluid between the sump and the compression chambers,
said sleeve valve being weighted and rotatable under centrifugal force to vary the flow of fluid to the sump.

11. A fluid transmission comprising a housing,
a ring fixedly mounted in the housing,
a prolate shaped rotor rotatably mounted in said housing and within said ring, said ring having a plurality of compression chambers therein, said compression chambers being arranged between the outer surface of the rotor and the inner surface of said ring,
said housing having a sump therein, and a plurality of holes extending from the sump to each of said compression chambers through which holes fluid passes to and from the compression chambers and the sump,
a sleeve valve adjacent each of said compression chambers and within said ring, said ring having a duct extending from the sleeve valve to a compression chamber, and a port extending from the sleeve valve to the sump to control the flow of fluid between the sump and the compression chambers,
gate means in the ring arranged at both ends of each compression chamber, said gate means slidably engaging the periphery of the rotor, said gate means forming both ends of the compression chambers.

References Cited by the Examiner

UNITED STATES PATENTS

| | | | |
|---|---|---|---|
| 2,240,662 | 5/41 | Montgomery | 192—57 |
| 2,735,529 | 2/56 | Austin | 192—58 |

DON A. WAITE, *Primary Examiner.*

DAVID J. WILLIAMOWSKY, *Examiner.*